Figure 1:
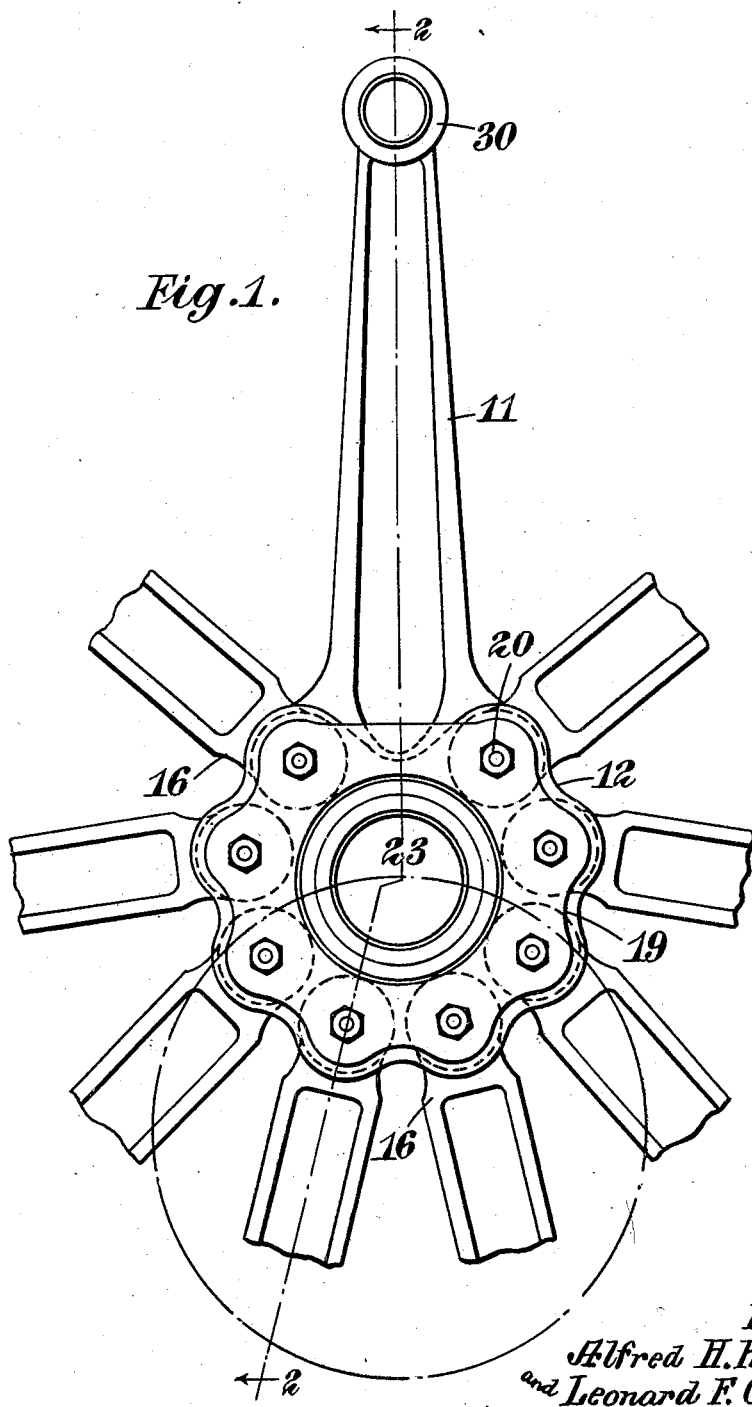

March 22, 1932.  A. H. R. FEDDEN ET AL  1,850,665
LUBRICATION SYSTEM
Filed Aug. 15, 1930   2 Sheets-Sheet 1

Inventors
Alfred H. R. Fedden
and Leonard F. G. Butler
by Wilkinson & Mawhinney
Attorneys.

March 22, 1932.  A. H. R. FEDDEN ET AL  1,850,665
LUBRICATION SYSTEM
Filed Aug. 15, 1930    2 Sheets-Sheet 2
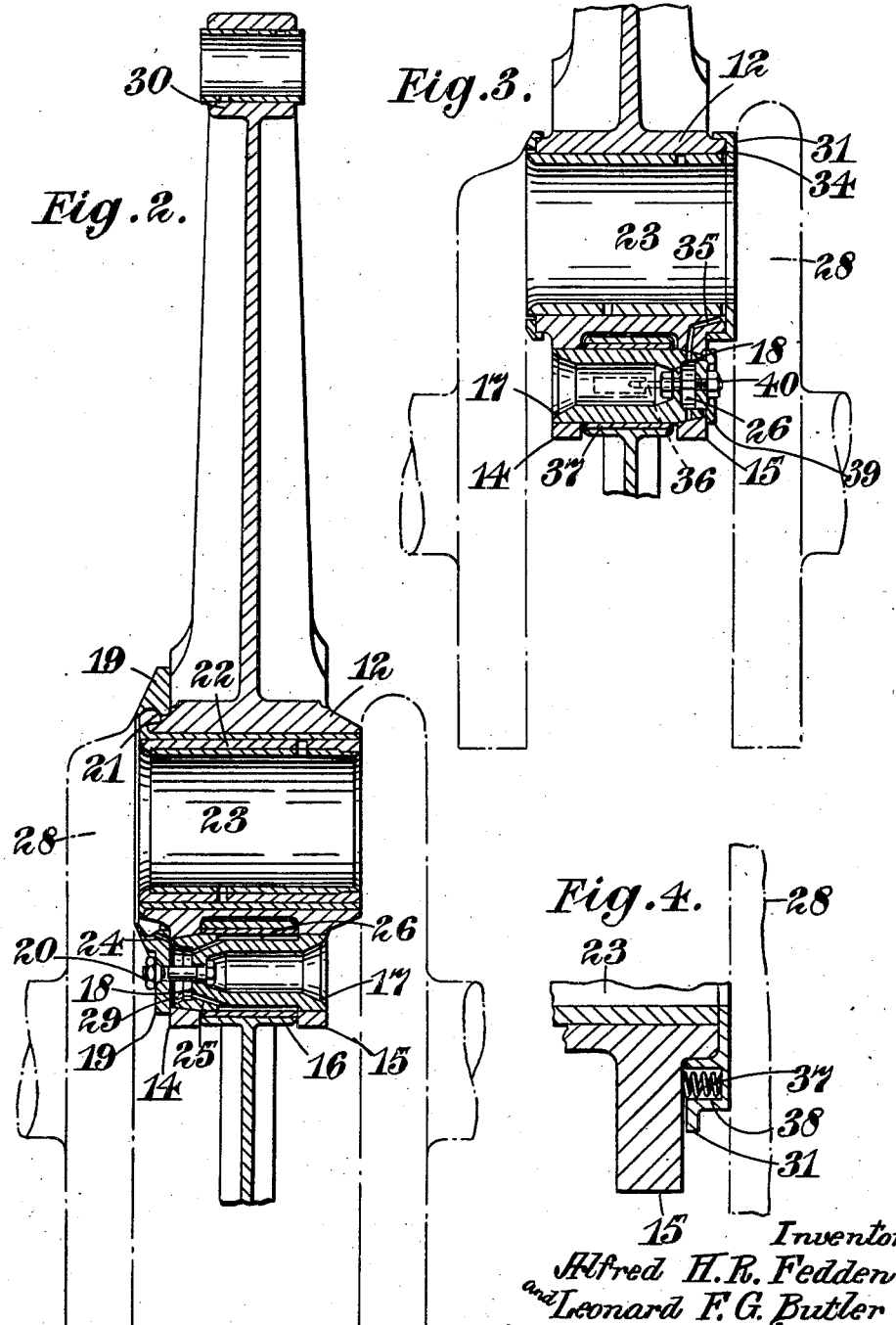

Patented Mar. 22, 1932

1,850,665

UNITED STATES PATENT OFFICE

ALFRED HUBERT ROY FEDDEN AND LEONARD FREDERICK GEORGE BUTLER, OF BRISTOL, ENGLAND, ASSIGNORS TO THE BRISTOL AEROPLANE COMPANY LIMITED, OF BRISTOL, ENGLAND, A BRITISH COMPANY

LUBRICATION SYSTEM

Application filed August 15, 1930, Serial No. 475,530, and in Great Britain August 22, 1929.

This invention is for improvements in or relating to lubrication systems, and has for its object to provide an improved construction and arrangement of parts for the lubrication of an auxiliary bearing or bearings which is (or are) associated with a main bearing. Hitherto, it has been customary to provide for the lubrication of the auxiliary bearing by a direct feed from the main bearing, but this method is disadvantageous in that there is a serious risk of the supply to the main bearing escaping too quickly to the auxiliary bearing, so that the film of oil in the main bearing fails.

According to one feature of the present invention there is provided, in a lubricating system employing lubricant under pressure, the combination with a bearing to which lubricant is supplied, of closure means at an end thereof to provide a chamber which intercepts the lubricant discharged from the bearing, and a passage to convey said lubricant from the chamber to an auxiliary bearing to lubricate it.

This feature of the invention also comprises more specifically the combination with a master connecting rod engaging a crank-pin, an auxiliary connecting rod or rods carried on the big-end of the master-rod, and means for supplying lubricant under pressure to the main bearing, of a plate-like member constituting a closure for the main bearing and providing a chamber to intercept the lubricant escaping therefrom, with passages or channels conveying the lubricant from said chamber to the auxiliary bearing or bearings.

According to another feature of this invention there is combined with a master connecting rod engaging a crank-pin, a collecting-ring surrounding the end of the main big-end bearing to receive the oil escaping therefrom and means to lead oil to the bearings of auxiliary connecting rods carried on the big-end of the master-rod.

In a preferred form of construction for effecting the lubrication of the auxiliary bearings, there is provided an annular plate-like member surrounding the big-end bearing and extending across the open end of a hollow wrist-pin, said plate being formed with a groove on its inner edge to receive oil from said bearing and with a duct leading from said groove to the interior of the wrist-pin. The hollow wrist-pins may each be formed with a transverse diaphragm near to the end closed by the collecting-ring, and a bolt may extend through the said diaphragm to secure the collecting-ring in position.

Particular forms of main and auxiliary bearings will now be described by way of example with reference to the accompanying drawings of which Figure 1 is a front elevation of the connecting rods of a radial cylinder internal combustion engine, Figure 2 is a side sectional elevation along the line 2—2—2 of Figure 1, Figure 3 is a side sectional elevation of a slightly modified form of arrangement of main and auxiliary bearings, according to this invention, and Figure 4 is an enlarged view of a detail of Figure 3.

A master connecting rod 11 is formed with a big-end 12, which embraces a crank-pin 23, and is provided with two parallel flanges 14, 15, between which the inner ends 16 of the other connecting rods are situated, and held in position by wrist-pins 17. The wrist-pins 17 are of tubular form, each having one end closed by a diaphragm 18. An oil-collecting ring 19 fits over the master big-end 12 and is held in position by bolts 20 which pass through the diaphragms 18 of the wrist-pins 17. The ring 19 is provided with an internal groove 21 which collects the oil which escapes from the end of a sleeve 22 surrounding the crank-pin 23. From the internal groove 21 of the ring 19, conduits 24 lead to the outer ends of the wrist-pins 17 each of which is formed with a series of tubular passages 25 running from outside the diaphragm 18 to an annular space 26 lying between the pin 17 and the bearing surface of the inner end 27 of its connecting rod.

The outer surface of the ring 19 fits closely against the inner surface of the crank web 28. This arrangement ensures that all the oil which escapes from the end of the crank-pin 23 is collected in the annular groove 21 of the ring 19.

All the wrist-pins 17 are held firmly in position by the ring 19 and the bolts 20, and the outer end of each wrist-pin forms, by an annular space 29 surrounding each bolt 20, a reservoir for oil which escapes from the crank-pin 23.

At the other end of the crank-pin 23 the oil which escapes is thrown out in the usual way and serves to lubricate the small end bearings 30 of the connecting rods. If desired, another connecting ring similar to the ring 19 may be provided at this end to collect an additional quantity of oil which may also be passed on to the wrist-pins 17 as above described.

Figure 3 shows a modified form of construction embodying this invention, also as applied to a radial cylinder internal combustion engine. As in Figures 1 and 2 a big-end 12, which embraces a crank-pin 23 carries, between two flanges 14 and 15 a series of wrist-pins 17 which hold the big-ends of the other connecting rods in position.

At one end of the big-end bearing there is a flanged annular plate 31, the flange of which surrounds the big-end 12 and the annular portion of which fits closely between the big-end 12 and the crank web 28. The inner edge of the big-end 12 is bevelled to form an annular groove 34 which is connected by ducts 35 to the annular space 26 beyond the diaphragm 18 of the wrist-pin 17. The annular space 26 is provided with another series of ducts 36 which communicate with the bearing surface 37 of the connecting rod. The flanged plate 31 may either be fixed to rotate with the crank web 28 or it may be fixed to the big-end and bear against the web 12.

The oil which escapes from the big-end bearing will flow into the annular groove 34 and thence by ducts 35, the annular space 26 and the ducts 36, to lubricate the various wrist-pins.

It is essential that the oil should pass between the big-end 12 and the flanged plate 31, and not between the plate 31 and the web 28. To ensure that the oil flows in the correct path compression springs may be provided to urge the flanged plate 31 close against the crank web 28. Such an arrangement is shown in Figure 4 which is an enlarged sectional view of the flange 15 and part of the crank-pin 23 and crank web 28, with the flanged plate 31 between the flange 15 and the crank web 28. A compression spring 37 is situated in a conveniently shaped hole 38 which is formed in the plate 31 and the plate 31 is thus pressed against the web 28 and the passage of oil prevented between the plate 31 and the web 28. Several springs such as 37 may be arranged in a circle round the crank-pin and their function is to ensure that the oil shall initially flow in the desired path from the big-end bearing to the auxiliary or wrist-pin bearing. Once the oil has commenced to flow in this desired path the pressure of the oil admitted to the big-end bearing serves to preserve the desired state of affairs and the wrist-pin bearings continue to be effectively lubricated.

It will be seen that the annular spaces 26 of the wrist-pins 17 are not, in this construction, covered by the end plate 31. A small circular cover 39 may be provided for each wrist-pin 17 and may be bolted to the diaphragm 18 by a bolt 40.

It will be seen that with this system of lubrication, no increase in the oil supply is required for the lubrication of the wrist-pins, for this is effected by oil which has passed through and lubricated the big-end bearing. In the systems hitherto used, the oil has been discharged from the main bearing direct to the crank case, so that the whole pressure drop or pressure gradient takes place in the big-end bearing, whereas with the arrangement according to the present invention this pressure drop is distributed over the big-end bearing of the auxiliary or wrist-pin bearings; the necessary pressure is therefore maintained in the big-end bearing and an adequate supply is ensured for the auxiliary or wrist-pin bearings.

We claim:—

1. In combination with a master connecting rod engaging a crank-pin, a collecting ring surrounding the end of the master connecting-rod bearing to receive oil escaping therefrom and means to lead the oil to the bearings of auxiliary connecting-rods carried on the big end of the master connecting rod.

2. In combination with a master connecting rod and a plurality of auxiliary connecting rods engaging hollow wrist-pins carried in flanges extending from the big-end of the master connecting rod, a collecting ring surrounding the end of the master connecting rod bearing to receive oil escaping therefrom and means to lead the oil to the hollow wrist-pins.

3. In combination with a master connecting rod and a plurality of auxiliary connecting rods engaging hollow wrist-pins carried by the big-end of the master connecting rod, an annular plate-like member surrounding the master big-end bearing and extending across the open ends of the hollow wrist pins, said plate being formed with a groove on its inner edge to receive oil from the said bearing and with a duct leading from the said groove to the interior of the wrist-pins.

4. A combination according to claim 3 wherein the hollow wrist-pins are each formed with a transverse diaphragm near the end closed by the collecting ring and wherein a bolt extends through the said diaphragm to secure the collecting-ring in position.

In testimony whereof we have signed our names to this specification.

ALFRED HUBERT ROY FEDDEN.
LEONARD FREDERICK GEORGE BUTLER.